July 23, 1957  C. M. HINES ET AL  2,800,644
ELECTRIC CHECKING APPARATUS
Filed June 30, 1954  2 Sheets-Sheet 1
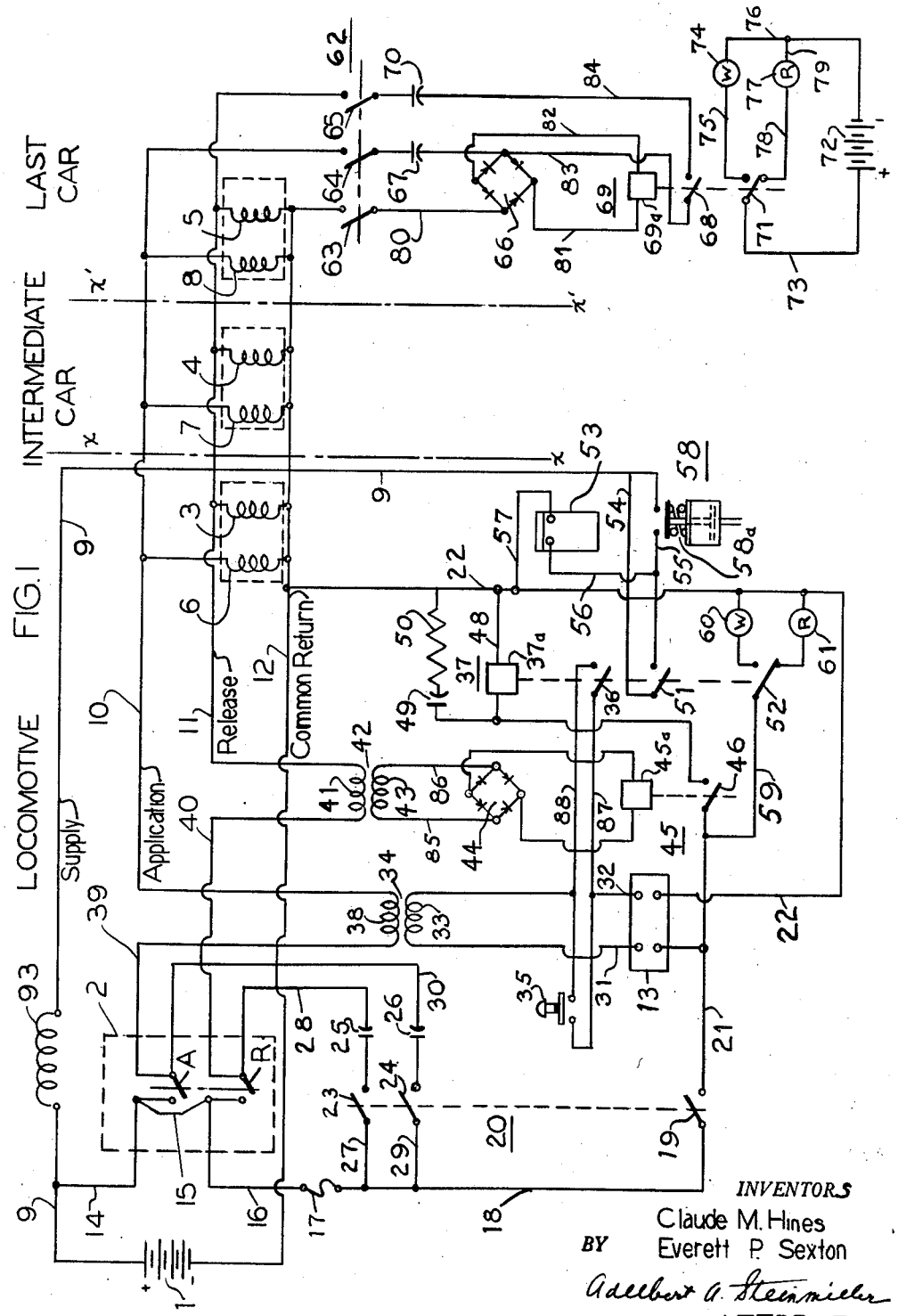
INVENTORS
Claude M. Hines
Everett P. Sexton
BY
Adelbert A. Steinmiller
ATTORNEY

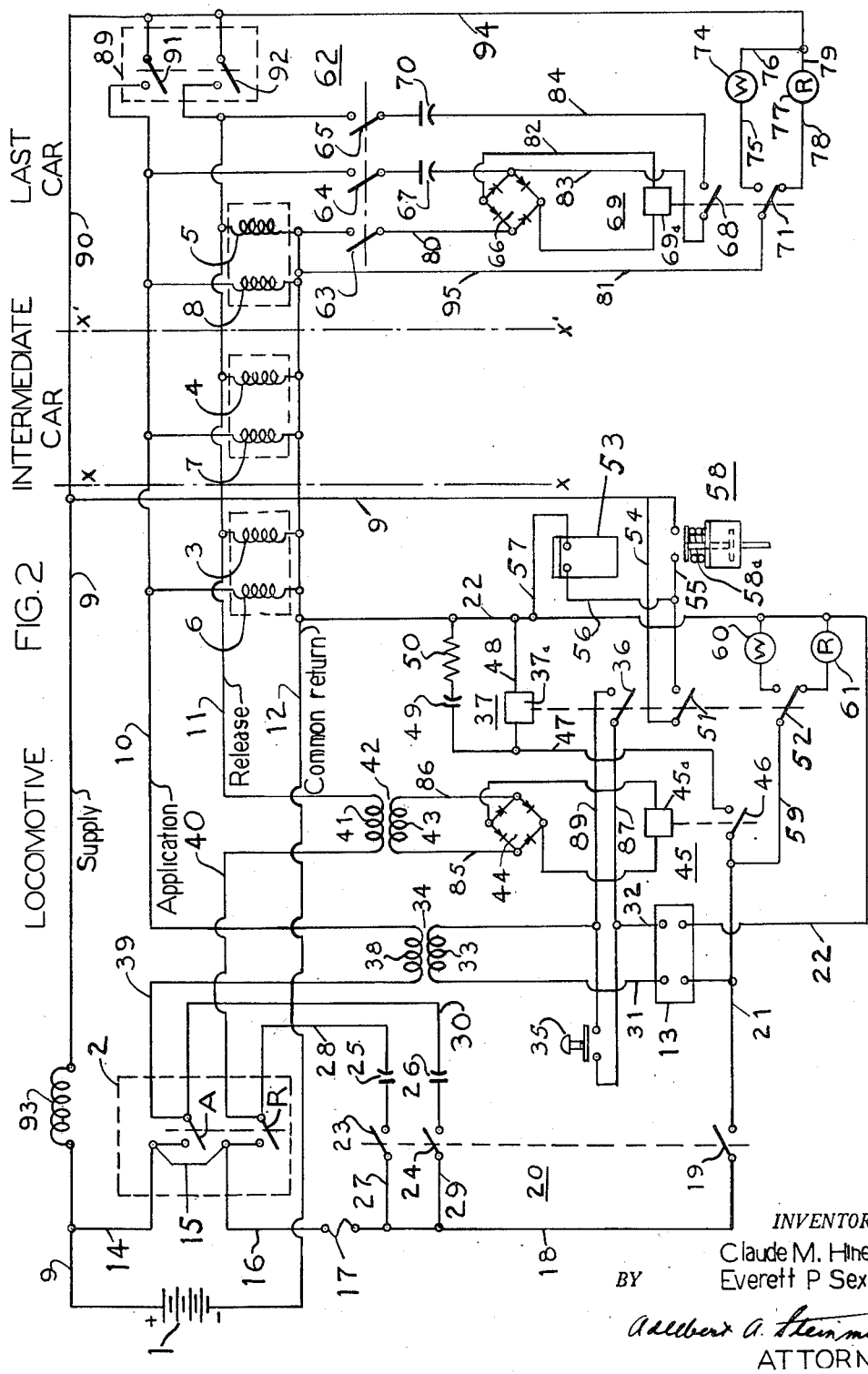

United States Patent Office 2,800,644
Patented July 23, 1957

2,800,644

ELECTRIC CHECKING APPARATUS

Claude M. Hines, Verona, and Everett P. Sexton, East McKeesport, Pa., assignors to Westinghouse Air Brake Company, Wilmerding, Pa., a corporation of Pennsylvania Application June 30, 1954, Serial No. 440,352

3 Claims. (Cl. 340—213)

This invention relates to improvements in electric circuit checking apparatus, and more particularly, to improvements in circuit checking apparatus adapted to be associated with electro-pneumatic brake apparatus employed on a train of cars to signal the integrity or lack of integrity of control circuits or other electrical devices associated therewith.

This invention is an improvement over similar apparatus disclosed and claimed in the application of Andrew J. Sorensen for Electric Circuit Checking Equipment, Serial No. 299,632, filed July 18, 1952, now Patent No. 2,736,882, and assigned to the assignee of the present application.

The desirability of continuously indicating the integrity or lack of integrity of the electrical control circuits and of the magnet valve windings in electropneumatic brake control systems on railroad trains has been apparent for some time, and various means and methods have been proposed and employed for this purpose. However, prior art devices are somewhat more complex than the apparatus which embodies the present invention, as will be more clearly apparent hereinafter.

The apparatus of the present invention provides a positive checking arrangment for it shuts off the source of checking current on the locomotive when a fault occurs in any control circuit. This apparatus also accomplishes integrity indication at the rear end of the train without the use of additional wires running the length of the train, and with a minimum of relay equipment on the last car.

It is a primary object of our invention to provide new and improved circuit checking apparatus.

Another object is the provision of a new and improved integrity checking circuit.

Another objective is the provision of a new and improved integrity checking circuit of the type in which a checking alternating current may be superimposed on a direct current used for control purposes.

Still another object is the provision of a new and improved integrity checking circuit in which the same conductors are used for carrying control and checking currents.

A further objective of this invention is the provision of a new and improved integrity checking circuit in which indications of circuit conditions affecting integrity are provided at a plurality of locations with a minimum of equipment.

Still a further object of our invention is the provision of a new and improved integrity checking circuit offering the maximum protection against failure of the checking apparatus itself.

Other objects will become apparent after a study of the accompanying specification when taken in connection with the drawings shown herein which Fig. 1 is a schematic circuit diagram of one embodiment of the invention, and Fig. 2 is a modification of a portion of the circuit of Fig. 1.

*Description—Fig. 1*

For the purpose of illustrating nature and utility of this invention, it is shown in the drawing of Fig. 1 associated with a simplified brake control apparatus including a source of direct current such as a battery 1, and an electro-pneumatic master controller 2 of any convenient and conventional design, such for example as that described and claimed in Patent No. 2,068,345, issued January 19, 1937, to Donald L. McNeal for Electro-Pneumatic Brake Equipment. A detailed explanation of this master controller device may be obtained from this mentioned patent of so desired.

Whereas the train may comprise any number of cars, for simplicity, in illustrating the invention a two-car train is shown, the release magnet valves on the locomotive, intermediate car, and last car being designated by the reference numerals 3, 4 and 5, respectively, and the application magnet valves being designated 6, 7 and 8, respectively. It should be understood that all other intermediate cars on a train would be similarly equipped, but the showing thereof is not essential to an understanding of the invention. In the drawing, the locomotive and last car of the train are shown separated from the intermediate car by lines X—X, and X'—X'. The brake control apparatus also includes a battery supply wire 9 on the locomotive only, and an application control wire 10, a release control wire 11, and a common return wire 12, all of which extend from the locomotive throughout the train to the last car, contacts A and R of the aforementioned electro-pneumatic master controller 2 controlling the application of current to wire 10 and 11 respectively.

As will be explained in more detail herein, the integrity checking is accomplished by generating at the locomotive an alternating current of suitable frequency, such for example, as 3,000 cycles per second, and transmitting this alternating current signal to the end of the train and thence back to the locomotive with signal light means to provide indications of signal integrity. These signal lights are controlled by relays energized by a direct current obtained at the locomotive and last car by rectifying a portion of the alternating current.

To accomplish this objective, an alternating-current generator, which may take the form of a commercial oscillator tube, as shown in the prior copending application of Andrew J. Sorensen referred to above. This generator, generally designated by reference numeral 13 of any convenient design, is provided on the locomotive. The locomotive will be referred to herein as a first station. The generator 13 is adapted to be energized by battery 1 by way of battery supply wire 9, wire 14, jumper wire 15 inside the controller 2, wire 16, fuse 17, wire 18, contact arm 19 of a triple-pole single-throw switch generally designated 20, wire 21, generator 13, wire 22, and common return wire 12 back to the battery 1. Switch 20 is manually operable, and includes additional arms 23 and 24 for use when the locomotive is operated as a trailing unit as will be hereinafter more fully apparent, both arms 23 and 24 being connected to wire 18. Connected in series with contacts 23 and 24 are capacitors 25 and 26 respectively for purposes of arc suppression. Contact arm 23 is connected in parallel with release contact member R in the electro-pneumatic conroller 2 by way of wire 16, fuse 17, wire 18, wire 27, contact arm 23, capacitor 25 and wire 28. Contact arm 24 is connected in parallel with the application contact member A in the controller 2 by way of jumper 15, wire 16, fuse 17, wire 18, wire 29, contact arm 24, capacitor 26 and wire 30.

The output of generator 13 is applied to wires 31 and 32. If a conventional oscillator tube is used as generator 13, then wires 31 and 32 would be connected to the plate circuit terminals of the tube. As shown in the drawing with generator 13, wire 31 is connected to one terminal of the primary 33 of a transformer generally designated by the reference numeral 34. Output lead 32 of generator 13 is connected to the other terminal of primary 33 by way of two parallel switch paths, one comprising a manual reset switch 35 and the other a contact arm 36 of a relay 37 having a winding 37a provided for purposes to be hereinafter apparent. One end of secondary 38 of transformer 34 is connected by way of lead 39 to the A switch arm in controller 2, the other end of secondary 38, which is of low output impedance is connected to aforementioned application control wire 10.

The aforementioned switch arm R in controller 2 is connected by way of wire 40 to one terminal of primary 41 of a transformer generally designated by the reference numeral 42, the other terminal of primary 41 being connected to to aforementioned release control wire 11. The secondary 43 of transformer 42 is connected to apply its output to a full-wave rectifier 44, of any convenient design, and the output of the rectifier 44 energizes the winding 45a of a relay 45 having normally open contact 46. Contact 46 when closed connects the aforementioned wire 21 to one terminal of an aforementioned relay winding 37a by way of a wire 47, the other terminal thereof being connected by way of wire 48 and wire 22 to the aforementioned common return wire 12. Winding 37a of relay 37 has connected in parallel therewith the capacitor 49 and resistor 50, connected in series with each other to provide time delay before drop-out of relay 37. Relay 37 in addition to the aforementioned contact arm 36 has a front contact arm 51 and a front and back contact arm 52. Contact 51 when closed completes a circuit for energizing a magnet valve 53, by way of battery 1, supply wire 9, wire 54, closed contact 51, wire 55, wire 56, magnet valve 53, wire 57, wire 22, and return wire 12 to the battery. This magnet valve is provided for purposes to be hereinafter more fully apparent.

Connected in parallel with contact 51 of relay 37 is a pneumatic switch 58. The pneumatic switch 58 is operated by pressure in a line connecting the brake valve (not shown) to master controller 2, and its contacts are so arranged as to be normally held closed by a biasing spring 58a and adapted to be opened when a small predetermined degree of pressure is in the aforesaid line, for purposes to be hereinafter more apparent.

The aforementioned contact 52 is connected to wire 21 of positive potential by way of wire 59 such that when contact 52 is in its front closed position a circuit is completed by way of a white indication light 60 to wire 22 and thence to the return wire 12 of negative potential, and when contact 52 is in its back closed position a circuit is completed by way of a red indication light 61 to wire 22 and thence to return wire 12.

On the last car of the train, which may be referred to herein as a second station, there is provided an indication circuit somewhat similar to the indication circuit on the locomotive. A manually operated triple-pole, single-throw switch generally designated by the reference numeral 62 has switch arms 63, 64 and 65 adapted when the switch is closed to close circuits to wires 12, 10 and 11, respectively. Switch arm 63 is connected by wire 80 to one input terminal of a full-wave rectifier 66 of any suitable design, which has the other input terminal connected by way of blocking condenser 67 to switch arm 64, and also to a contact arm 68 of a detector relay 69 having a winding 69a connected across the output terminals of the rectifier 66 so as to be energized therefrom. Contact 68 of relay 69 is connected by way of a blocking condenser 70 to aforementioned switch arm 65. Relay 69 has a front and back contact arm 71. Contact 71 is connected to a separate local battery supply 72 (such as the car battery) by a lead 73 such that when contact 71 is in its front closed position, a white signal light 74 is energized by way of wires 75 and 76, and when contact 71 is in its back closed position, a red warning signal light 77 is energized by way of wires 78, 79 and 76.

*Operation*

When the integrity indicating apparatus is idle, both relays 45 and 69 are normally deenergized. In starting the apparatus, the manually operated switches 20 and 62 on the locomotive and last car respectively, are first closed, and, with no fault existing in the brake control circuits including control wires 9, 10, 11 and 12 the relays having windings 45a and 69a can be energized and picked up by depressing the manually operated reset switch 35 of the locomotive equipment. This closes the primary circuit to the transformer 34 and thus imposes the 3,000 cycle alternating current at secondary 38 upon the application wire 10 extending throughout the train. This circuit continues through switch arm 64, capacitor 67, the full-wave rectifier 66 on the last car, then returns by way of wire 80, switch arm 63, the battery return wire 12, thence across the supply battery 1, to wire 9, wire 14, jumper wire 15 of the master controller 2, thence by way of wire 16, fuse 17, wire 18, wire 29, the arc-suppression circuit including switch arm 24, capacitor 26, wire 30, wire 39 to the secondary 38 of transformer 34 thus completing the circuit through said secondary 38. The full-wave rectifier 66 on the last car will be energized and will then supply direct current to relay 69 having winding 69a by way of wires 81 and 82, thereby energizing the relay 69 and closing the circuit through contact 68 and through contact 71 in its front position. Contact 71 in its front closed position causes the white "all clear" indication light 74 to be energized and illuminated. The closing of contact 68 of relay 69 will connect the 3,000 cycle alternating current in the application wire 10 to the release control wire 11 by way of switch arm 64, capacitor 67, wire 83, contact arm 68, wire 84, capacitor 70, switch arm 65, thence by wire 11 to the primary 41 of transformer 42, and by way of wire 40 to wire 28, capacitor 25, switch arm 23, wire 27, wire 18, wire 29, switch arm 24, capacitor 26, wire 30, and wire 39 to the secondary 38 of transformer 34. The secondary 43 of transformer 42 will then provide an alternating current to the rectifier 44 by way of wires 85 and 86, the output of which in turn will energize the relay winding 45a of relay 45 to close contact member 46 and thus supply direct current from the supply battery 1 to the repeater relay 37 having winding 37a. The repeater relay 37 will be energized and picked up thereby closing contact members 36 and 51, and closing contact 52 in its front closed position. Closing contact member 36 will by-pass the manual reset switch 35 by way of wires 87 and 88, and maintain the primary circuit of the transformer 34 until a fault is indicated in the brake control circuits or the switches 20 and/or 62 are manually opened. The condenser 49 and resistor 50 provide a delay in the drop-out time of the relay 37 following interruption of the energizing circuit thereof so that momentary interruptions of the order of several seconds in the energizing circuit will not cause drop-out of the relay 37.

Closing contact member 51 of relay 37 will provide a current for energizing a magnet valve 53 which operates with the pneumatic brakes to effect a brake application should an electro-pneumatic brake application be attempted with the equipment showing faulty control circuits.

Magnet valve 53 is similar in operation to those described in Patents Nos. 2,573,442 for Circuit Integrity Indicating System, and 2,605,329 for Apparatus for Checking the Integrity of Electrical Circuits, issued October 30, 1951, and July 29, 1952, respectively, to Claude M. Hines, and both assigned to the assignee of the present invention. Reference may be had to these patents for a fuller understanding of the operation of valve 53 and its function in a brake system.

Closing contact member 52 of repeater relay 57 will energize the white signal light 60 indicating the circuits are in operating order. After light 60 is illuminated, the operator's hand may be removed from switch 35, which will be retuned to its open position by biasing means, not shown. In case of failure of the application wire 12 through the train, both detector relays 45 and 69 having windings 45a and 69a will be deenergized, causing the lights 61 and 79 to be illuminated. The relay 69 will open contact member 68 causing relays 45 and 37 on the locomotive to be deenergized as can be seen from their respective energizing circuit, thereby disconnecting generator 13 from transformer 34. After the fault has been cleared, operation of the manual reset switch 35 will be required before the red signal lights 61 and 77 can be cleared.

It is accordingly seen that failure of the release control circuit including wire 11 will also effect deenergization of the detector relay 45, which in turn will deenergize the repeater relay 37 having winding 37a, and open the primary circuit of the transformer 34 to thus remove the alternating current supply to the application wire 10, and thereby deenergize the repeater relay 69. With both the detector relay 37 on the locomotive, and the detector relay 69 on the last car deenergized, the red signal lights 61 and 77 at both ends of the train will be energized to indicate faulty train circuits.

A break in the return wire 12 would open the secondary 38 of the transformer 34 thus removing the alternating current supplied to the application wire 10 to cause deenergization of the detector relays 37 and 69 which in turn would effect illumination of the red "fault" lamps 61 and 77 to indicate such fault.

It should be emphasized here, that on all the supposed fault occurrences mentioned herein, simultaneously with the deenergization of the relay 37 and energization of the red "fault" lamp 61, the opening of contact 36 of relay 37 results in the opening of the primary 33 of transformer 34 thereby definitely indicating a fault condition by removal of all integrity indicating current throughout the checking circuits.

A manually operated back-up switch 89 may be included in this apparatus as is shown in the embodiment shown in Fig. 2 for the purpose of controlling the brakes from the rear of the train. This can be accomplished by connecting a wire 90 to the battery supply wire 9 at the locomotive and extending this wire throughout the train to the rear car where the back-up switch 89 including two contacts 91 and 92 is adapted (by means not shown) to connect wire 9 to the application wire 10 and release wire 11, respectively, when a brake application is desired.

Operation of the master controller 2, or operation of the back-up switch 89 for controlling the brakes, will not shunt the flow of alternating checking current through the brake control circuits and thus cause a fault indication because inductance coil 93 prevents any alternating checking current from being conducted through the supply wire 9 or wire 90 (Fig. 2) during a brake application. Condensers 67 and 70 prevent direct current in the brake control circuits from interfering with proper operation of the rear end checking equipment upon the occurrence of a fault in the control circuits.

In the embodiment shown in Fig. 2, the circuit shown and the reference numerals used are identical with those of Fig. 1 with the exception of the addition of the back-up switch circuits and a modification of the means for energizing the signal lamps 74 and 79. The modified means of energizing the signal lamps on the rear of the train include a signal supply wire 94 from the wire 90 and a signal return wire 95 to the return wire 12 thereby eliminating the necessity of using the local battery supply 72 and wires therefrom as shown in Fig. 1. In this modification, a break in the supply wire 9 or wire 90 will be indicated by a lack of any signal indication on the rear of the train.

Although we have herein shown and described but two embodiments of our invention, it should be understood that various changes and modifications may be made therein within the scope of the appended claims without departing from the spirit of our invention.

Having now described our invention, what we claim as new and desire to secure by Letters Patent, is:

1. Apparatus for checking the integrity of a control system having a first and a second station including first, second, and third control wires between said first and said second stations, in combination, a first source of power at the second station supplying direct current and having first and second terminals of opposite polarity with respect to each other, said third control wire being connected to said second terminal, a source of alternating current having a pair of input power leads and a pair of high frequency alternating current output leads, a triple-pole, single-throw switch having three switch arms, circuit means including one of said switch arms and said third control wire connecting said pair of input power leads to said first source of power, said first control wire having means including a condenser and another of said switch arms connecting one end thereof to said first terminal, a first transformer having a primary winding and a secondary winding, first relay means having a plurality of contact arms, other circuit means including a manual reset switch and one of said contact arms connected in parallel paths connecting said primary winding to said pair of high frequency alternating current output leads, said secondary winding being connected in series with said first control wire, first rectifier means at the first station operatively connected to said first and third control wires to be energized therefrom, second relay means at the first station operatively connected to and energized from said first rectifier means, said second relay means including first and second contact arms, further circuit means including another condenser and said first contact arm in its closed position upon the energization of said second relay means to provide a high frequency alternating current connection between said first control wire and said second control wire, a pair of lamps for indicating clear and fault respectively while energized, a second source of power, still further circuit means selectively connecting said pair of lamps by way of said second contact arm of said second relay to said second source of power for energizing said lamps selectively in accordance with energization and deenergization of the said second relay means, a second transformer at the second station having a primary winding and a secondary winding, said second control wire having last named primary winding connected in series therein, said second control wire being connected by way of a further condenser and the third of said switch arms of said triple-pole single-throw switch to said first terminal, second rectifier means connected to and energized from the last named secondary winding, third relay means controlled by the output of said second rectifier means, fault indicator means, and still additional circuit means interconnecting said third relay means, said first relay means, and said fault indicating means for controlling the energization of the first relay means and fault indicating means in accordance with the energization and deenergization of the said second rectifier means.

2. Apparatus for checking the integrity of a control system of the type having first, second and third control wires extending between first and second stations, said first and third control wires being adapted to be connected to form one control circuit, said second and third control wires being adapted to be connected to form a second control circuit, a source of direct current at the second station, means for selectively connecting said source of direct current to said one control circuit and said second control circuit, said apparatus comprising an output transformer having a secondary winding electrically interposed in series in said first control wire and also having a primary winding, a first relay having a plurality of contacts, a source of high frequency alternating current operatively connected to said primary winding by way of a contact of said first relay for energizing said primary winding while the said contact is closed, manual reset switch means connected in parallel with said contact, circuit means including condenser means interconnecting said first, second and third control wires at said second station to provide paths for the flow of high frequency alternating current while excluding the flow of direct current therefrom, first rectifier means at the first station, other circuit means including a first condenser connecting said first rectifier means between said first and third control wires to be energized by the high frequency alternating current, a second relay having first and second contact arms, said second relay being operatively connected to said first rectifier means to be energized therefrom, a second condenser, additional circuit means including said second condenser and said first contact arm for forming a high frequency alternating current operative connection between said first and second control wires while the second relay is energized, a source of potential at the first station, a clear indicating lamp and a fault indicating lamp, further circuit means connecting both said lamps to said source of potential by way of said second contact arm for energizing said lamps selectively in accordance with the energization and deenergization of said second relay, a second transformer means at the second station connected in series with said second control wire and energized by the high frequency alternating current in said second control wire, second rectifier means operatively connected to and energized from said transformer means, and third relay means having a single contact arm, said second rectifier means applying its output to said third relay to effect energization of said first relay when said single contact arm is closed, said third relay being energized while all the control wires are intact and becoming deenergized upon a break in any of said wires thereby deenergizing said first relay to effect opening of the operative connection between said source of high frequency alternating current and said primary winding of said output transformer until the connection is restored by the use of said manual reset switch means.

3. Apparatus for checking the integrity of a control system of the type having, first, second, third and fourth control wires extending between first and second stations, a source of direct current voltage at the second station, said first and said fourth control wires being connected to opposite terminals of said source of direct current voltage and carrying the voltage of said source from said second to said first station, said second and fourth control wires being adapted to be connected to form one control circuit, said third and fourth control wires being adapted to be connected to form a second control circuit, first switch means at said second station for selectively connecting said source of direct current voltage to said one control circuit and said second control circuit, and second switch means at said first station for selectively connecting said source of direct current voltage to said one control circuit and said second control circuit, said apparatus comprising an output transformer having a secondary winding electrically interposed in series in said second control wire and also having a primary winding, a first relay having a plurality of contacts, a source of high frequency alternating current operatively connected to said primary winding by way of a contact of said first relay for energizing said primary winding while the said contact is closed, manual reset switch means connected in parallel with said contact, circuit means including condenser means interconnecting said second, third and fourth control wires at said second station to provide paths for the flow of a high frequency alternating current while excluding the flow of direct current therefrom, first rectifier means at the first station, other circuit means including a first condenser connecting said first rectifier means between said second and fourth control wires to be energized by the high frequency alternating current, second relay having first and second contact arms, said second relay being operatively connected to said first rectifier means to be energized therefrom, a second condenser, additional circuit means including said second condenser and said first contact arm of said second relay for forming a high frequency alternating current operative connection between said second and third control wires while the second relay is energized, a clear indicating lamp and a fault indicating lamp at the first station, further circuit means connecting both of said lamps between said first and fourth control wires by way of said second contact arm of said second relay for energizing said lamps selectively in accordance with the energization and deenergization of said second relay, second transformer means at the first station connected in series with the said third control wire and energized by the alternating current in said third control wire, second rectifier means operatively connected to and energized from said transformer means, and third relay means having a single contact, said second rectifier means applying its output to said third relay to effect energization of said first relay when said single contact arm of said third relay is closed, said third relay being energized while all the control wires are intact and becoming deenergized upon a break in any of said wires, thereby deenergizing said first relay to effect opening of the operative connection between said source of high frequency alternating current and said primary winding of said output transformer until the connection is restored by the use of the manual reset switch means.

References Cited in the file of this patent

UNITED STATES PATENTS

| | | |
|---|---|---|
| 2,082,143 | Bossart | June 1, 1937 |
| 2,302,061 | Schirm | Nov. 17, 1942 |
| 2,460,789 | Thompson | Feb. 1, 1949 |
| 2,611,032 | Wells et al. | Sept. 16, 1952 |
| 2,640,978 | Claesson et al. | June 2, 1953 |
| 2,643,370 | Lawrence | June 23, 1953 |